United States Patent
Sagong et al.

(10) Patent No.: US 10,305,710 B2
(45) Date of Patent: May 28, 2019

(54) METHOD AND APPARATUS FOR OPERATING MULTIPLE MODULATION SCHEMES IN WIRELESS COMMUNICATION SYSTEM

(71) Applicant: Samsung Electronics Co., Ltd., Gyeonggi-do (KR)

(72) Inventors: Min Sagong, Gyeonggi-do (KR); Jeong-Ho Park, Seoul (KR); Jae-Won Kim, Gyeonggi-do (KR); Hyun-Kyu Yu, Gyeonggi-do (KR); Chi-Woo Lim, Gyeonggi-do (KR); Su-Ryong Jeong, Gyeonggi-do (KR); Sung-Nam Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 14/915,195

(22) PCT Filed: Aug. 25, 2014

(86) PCT No.: PCT/KR2014/007870
§ 371 (c)(1),
(2) Date: Feb. 26, 2016

(87) PCT Pub. No.: WO2015/030442
PCT Pub. Date: Mar. 5, 2015

(65) Prior Publication Data
US 2016/0211994 A1 Jul. 21, 2016

(30) Foreign Application Priority Data
Aug. 26, 2013 (KR) .................. 10-2013-0101082

(51) Int. Cl.
*H04L 27/00* (2006.01)
*H04L 27/32* (2006.01)
(Continued)

(52) U.S. Cl.
CPC .......... *H04L 27/0008* (2013.01); *H04L 27/12* (2013.01); *H04L 27/32* (2013.01);
(Continued)

(58) Field of Classification Search
CPC ..... H04L 27/0008; H04L 27/12; H04L 27/32; H04L 27/366
See application file for complete search history.

(56) References Cited

U.S. PATENT DOCUMENTS 7,826,415 B2   11/2010   Oh et al.
9,374,838 B2   6/2016   Takano et al.
(Continued)

FOREIGN PATENT DOCUMENTS

CN   1761182 A   4/2006
CN   1918809 A   2/2007
(Continued)

OTHER PUBLICATIONS

International Search Report dated Nov. 26, 2014 in connection with International, Application No. PCT/KR2014/007870; 9 pages.
(Continued)

*Primary Examiner* — Christopher M Crutchfield
*Assistant Examiner* — Tito Q Pham

(57) ABSTRACT

The present invention relates to a method for operating, by a base station, multiple modulation schemes in a wireless communication system, the method comprising the steps of: calculating the number of terminals, among the terminals in a cell managed by the base station, of which a channel state is included in a state that is lower than a preset state; reporting information related to the calculated number of terminals to an upstream entity of the base station; receiving information about a band, assigned by the upstream entity, for a hybrid frequency shift keying (FSK) and quadrature amplitude modulation (QAM) (FQAM) scheme on the basis
(Continued)

of a QAM scheme and a FSK scheme; and transmitting downwardly the information about the band for the FQAM scheme to the terminals of which a channel state is included in a state that is lower than the preset state. Other modified embodiments on the basis of the technical concept of the present invention are also possible.

20 Claims, 14 Drawing Sheets

(51) Int. Cl.
H04L 27/12 (2006.01)
H04L 27/36 (2006.01)
H04J 11/00 (2006.01)
H04L 5/00 (2006.01)

(52) U.S. Cl.
CPC ......... *H04L 27/366* (2013.01); *H04J 11/0056* (2013.01); *H04J 2011/0016* (2013.01); *H04L 5/0007* (2013.01)

(56) References Cited

U.S. PATENT DOCUMENTS

| | | | |
|---|---|---|---|
| 2004/0131125 A1 | 7/2004 | Sanderford, Jr. et al. | |
| 2009/0060094 A1 | 3/2009 | Jung et al. | |
| 2009/0268786 A1* | 10/2009 | Matsumoto | H04B 1/71052 375/148 |
| 2010/0034108 A1 | 2/2010 | Ode | |
| 2011/0255428 A1* | 10/2011 | Park | H04L 41/5067 370/252 |
| 2011/0317635 A1* | 12/2011 | Swaminathan | H04W 36/0088 370/329 |
| 2012/0063369 A1* | 3/2012 | Lin | H04B 7/15542 370/279 |
| 2012/0099472 A1* | 4/2012 | Joko | H04L 1/0021 370/252 |
| 2013/0003669 A1* | 1/2013 | Ohara | H04W 72/0453 370/329 |
| 2013/0010721 A1* | 1/2013 | Aiba | H04L 1/1812 370/329 |
| 2013/0089339 A1 | 4/2013 | Liu et al. | |
| 2013/0286930 A1* | 10/2013 | Nagata | H04B 7/15542 370/315 |
| 2014/0177687 A1 | 6/2014 | Seol et al. | |
| 2014/0211880 A1 | 7/2014 | Sagong et al. | |
| 2014/0211887 A1 | 7/2014 | Sagong et al. | |
| 2014/0269992 A1 | 9/2014 | Hong et al. | |
| 2014/0307645 A1* | 10/2014 | Ji | H04L 1/0003 370/329 |
| 2014/0307832 A1 | 10/2014 | Sagong et al. | |
| 2014/0328155 A1* | 11/2014 | Dhanda | H04L 1/0003 370/215 |
| 2017/0164254 A1* | 6/2017 | Takano | H04W 36/08 |

FOREIGN PATENT DOCUMENTS

| | | |
|---|---|---|
| CN | 102656930 A | 9/2012 |
| KR | 10-1219951 B1 | 1/2013 |
| KR | 10-2014-0081301 A | 7/2014 |
| KR | 10-2014-0096559 A | 8/2014 |
| KR | 10-2014-0096560 A | 8/2014 |
| KR | 10-2014-0111890 A | 9/2014 |
| KR | 10-2014-0123764 A | 10/2014 |
| KR | 10-2015-0009806 A | 1/2015 |
| WO | WO 2011-127004 A2 | 10/2011 |

OTHER PUBLICATIONS

Written Opinion of the International Searching Authority dated Nov. 26, 2014 in connection with International Application No. PCT/KR2014/007870; 5 pages.

Latif, Asma; "Hybrid-QAM-FSK (HQFM) OFDM Transceiver With Low PAPR"; retrieved from http://ppr.hec.gov.pk/Thesi8s/22S.pdf; Jan. 2009; 178 pages.

Office Action dated May 30, 2018 in connection with Chinese Patent Application No. 2014800589461.

* cited by examiner

METHOD AND APPARATUS FOR OPERATING MULTIPLE MODULATION SCHEMES IN WIRELESS COMMUNICATION SYSTEM

CROSS-REFERENCE TO RELATED APPLICATION(S)

The present application claims priority under 35 U.S.C. § 365 to International Patent Application No. PCT/KR2014/007870 filed Aug. 25, 2014, entitled "METHOD AND APPARATUS FOR OPERATING MULTIPLE MODULATION SCHEMES IN WIRELESS COMMUNICATION SYSTEM", and, through International Patent Application No. PCT/KR2014/007870, to Korean Patent Application No. 10-2013-0101082 filed Aug. 26, 2013, each of which are incorporated herein by reference into the present disclosure as if fully set forth herein.

TECHNICAL FIELD

The present disclosure relates to a method and an apparatus for operating a plurality of modulation schemes in a wireless communication system.

BACKGROUND ART

A wireless communication system has been developed to support a higher data transmission rate in order to meet wireless data traffic demands, which have continuously increased. For example, in order to increase the data transmission rate, wireless communication system technologies have been developed to improve spectral efficiency and increase channel capacities based on communication techniques such as an Orthogonal Frequency Division Multiplexing (OFDM) scheme or Multiple Input Multiple Output (MIMO) transmission/reception.

Meanwhile, in the wireless communication system, cell-edge users experiencing a low Signal-to-Noise Ratio (SNR) of a cell boundary far from a cell center, as well as a low Carrier-to-Interference and Noise Ratio (CINR) that are significantly influenced by a base station of an adjacent cell, correspond to factors limiting system performance. Accordingly, technologies such as Inter-Cell Interference-Coordination (ICIC), Coordinated Multi-Points (CoMP), and receiver side interference cancellation are developed to increase transmission efficiency of the cell-edge users.

DETAILED DESCRIPTION OF THE INVENTION

Technical Problem

Research on the above technologies has been conducted in terms of a technology for interference cancellation in a transmitter side or a technology for interference cancellation in a receiver side. However, basically, the need for an improved technology that can increase the channel capacity is increasing in order to provide optimal channel capacity to the cell-edge users.

Further, related arts assumed that interference signals have the Gaussian distribution to perform a decoding with low complexity and mainly used a Quadrature Amplitude Modulation (QAM) scheme to make a characteristic of the interference signal as close as possible to the Gaussian distribution. However, since the channel capacity of a non-Gaussian channel is larger than that of a Gaussian channel, it is possible to obtain a higher decoding performance in the non-Gaussian channel in comparison with the Gaussian channel if the decoding is properly performed. Accordingly, a modulation scheme to make the interference signal have a non-Gaussian characteristic is required.

Therefore, embodiments of the present invention propose a method and an apparatus for operating a plurality of modulation schemes in a wireless communication system.

Further, embodiments of the present invention propose a method and an apparatus for allocating bands of a plurality of modulation schemes in a wireless communication system.

In addition, embodiments of the present invention propose a method and an apparatus for transmitting and receiving information on a plurality of modulation schemes allocated in a wireless communication system.

Technical Solution

In accordance with an aspect of the present invention, a method of operating a plurality of modulation schemes by a Base Station (BS) in a wireless communication system is provided. The method includes: calculating a number of Mobile Stations (MSs) having a channel state equal to or lower than a preset state among all MSs within a cell managed by the BS and reporting information on the calculated number of MSs to a higher entity of the BS; receiving information on a band for a hybrid FSK and QAM Modulation (FQAM) scheme based on a Quadrature Amplitude Modulation (QAM) scheme and a Frequency Shift Keying (FSK) scheme, allocated by the higher entity; and delivering information on the band for the FQAM scheme to the MSs having the channel state equal to or lower than the preset state.

In accordance with another aspect of the present invention, a method of operating a plurality of modulation schemes by a higher entity in a wireless communication system is provided. The method includes: receiving a request for allocating a band for a hybrid FSK and QAM Modulation (FQAM) scheme based on a Quadrature Amplitude Modulation (QAM) scheme and a Frequency Shift Keying (FSK) scheme from a Base Station (BS) managed by the higher layer; and allocating the band for the FQAM scheme and delivering information on the band for the FQAM scheme to the BS.

In accordance with another aspect of the present invention, a method of operating a plurality of modulation schemes by a Mobile Station (MS) in a wireless communication system is provided. The method includes: reporting channel state information on the MS to a Base Station (BS); and receiving information on a band for a hybrid FSK and QAM Modulation (FQAM) scheme based on a Quadrature Amplitude Modulation (QAM) scheme and a Frequency Shift Keying (FSK) scheme from the BS.

In accordance with another aspect of the present invention, a Base Station (BS) for operating a plurality of modulation schemes in a wireless communication system is provided. The BS includes: a controller that calculates a number of Mobile Stations (MSs) having a channel state equal to or lower than a preset state among all MSs within a cell managed by the BS; a receiver that receives information on a band for a hybrid FSK and QAM Modulation (FQAM) scheme based on a Quadrature Amplitude Modulation (QAM) scheme and a Frequency Shift Keying (FSK) scheme, allocated by the higher entity; and a transmitter that reports information on the calculated number of MSs to a higher entity of the BS and delivers information on the band for the FQAM scheme to the MSs having the channel state equal to or lower than the preset state. In accordance with another aspect of the present invention, a higher entity for operating a plurality of modulation schemes and managing a sub group that includes a plurality of Base Stations (BSs) in a wireless communication system is provided. The higher entity includes: a receiver that receives a request for allocating a band for a hybrid FSK and QAM Modulation (FQAM) scheme based on a Quadrature Amplitude Modulation (QAM) scheme and a Frequency Shift Keying (FSK) scheme from a Base Station (BS) managed by the higher layer; and a transmitter that allocates the band for the FQAM scheme and delivers information on the band for the FQAM scheme to the BS.

In accordance with another aspect of the present invention, a Mobile Station (MS) for operating a plurality of modulation schemes in a wireless communication system is provided. The MS includes: a transmitter that reports channel state information on the MS to a Base Station (BS); a receiver that receives information on a band for a hybrid FSK and QAM Modulation (FQAM) scheme based on a Quadrature Amplitude Modulation (QAM) scheme and a Frequency Shift Keying (FSK) scheme from the BS; and a controller that controls signaling of the transmitter and the receiver.

Effects of the Invention

The present invention can achieve a higher performance of an FQAM modulation scheme by reporting an α value indicating a level of a non-Gaussian characteristic of Inter-Cell Interference (ICI) when the FQAM modulation scheme is operated.

BEST MODE FOR CARRYING OUT THE INVENTION

Hereinafter, various embodiments of the present invention will be described in detail with reference to the accompanying drawings. Further, in the following description of the present disclosure, a detailed description of known functions or configurations incorporated herein will be omitted when it may make the subject matter of the present disclosure rather unclear. The terms which will be described below are terms defined in consideration of the functions in the present disclosure, and may be different according to users, intentions of the users, or customs. Therefore, the definition should be made based on the overall contents of the present specification.

Embodiments of the present invention described below relate to a technology to combine a bandwidth-efficient modulation scheme and a power-efficient modulation scheme in the transmission/reception of a wireless communication system. Specifically, hereinafter, a method and an apparatus for operating a hybrid FSK and QAM (FQAM) technology in which QAM and Frequency Shift Keying (FSK) are combined. The FQAM technology supports both a characteristic of the QAM corresponding to the high spectral efficiency and a characteristic of the FSK in which the interference signal has the non-Gaussian characteristic.

FIG. 1 illustrates a basic concept of the FQAM according to an embodiment of the present invention. As illustrated, the FQAM scheme refers to a modulation scheme that includes both the QAM scheme characteristic and the FSK scheme characteristic and, hereinafter, 16-FQAM in which 4-ary QAM, that is, 4-QAM (QPSK) and 4-FSK using four modulation frequencies are combined, will be described as an example.

Figures 1A, 1B, 1C:
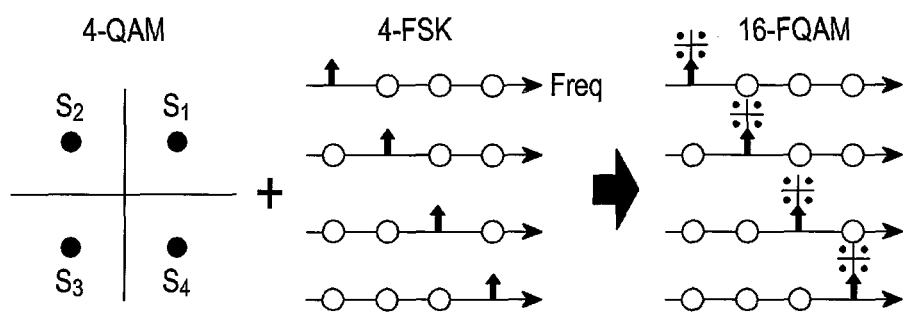
FIG. 1 illustrates a basic concept of an FQAM according to an embodiment of the present invention.

Referring to FIG. 1A, a constellation of 4-QAM includes four signal points S1, S2, S3, and S4 to which modulated digital signals can be mapped. The signal points have the same size and include complex modulation symbols (a, a), (−a, a), (−a, −a), and (a, −a) having a phase difference of 90 degrees from each other. For example, information bits 00, 01, 10, and 11 may be mapped to the signal points.

Referring to FIG. 1B, in the 4-FSK, information bits are carried on one of four different modulation frequencies and then transmitted. For example, with respect to the information bits 00, 01, 10, and 11, signal pulses F1, F2, F3, and F4 may be transmitted.

Referring to FIG. 1C, in the 16-FQAM in which the 4-QAM and the 4-FSK are combined, the four signal points S1, S2, S3, and S4 are transmitted in one of the four modulation frequencies F1, F2, F3, and F4. Accordingly, 16 pieces of information (that is, four information bits) can be transmitted in the 16-FQAM.

As described above, the FQAM refers to a modulation scheme in which information bits are loaded using the constellation and frequency positions.

Figure 2:
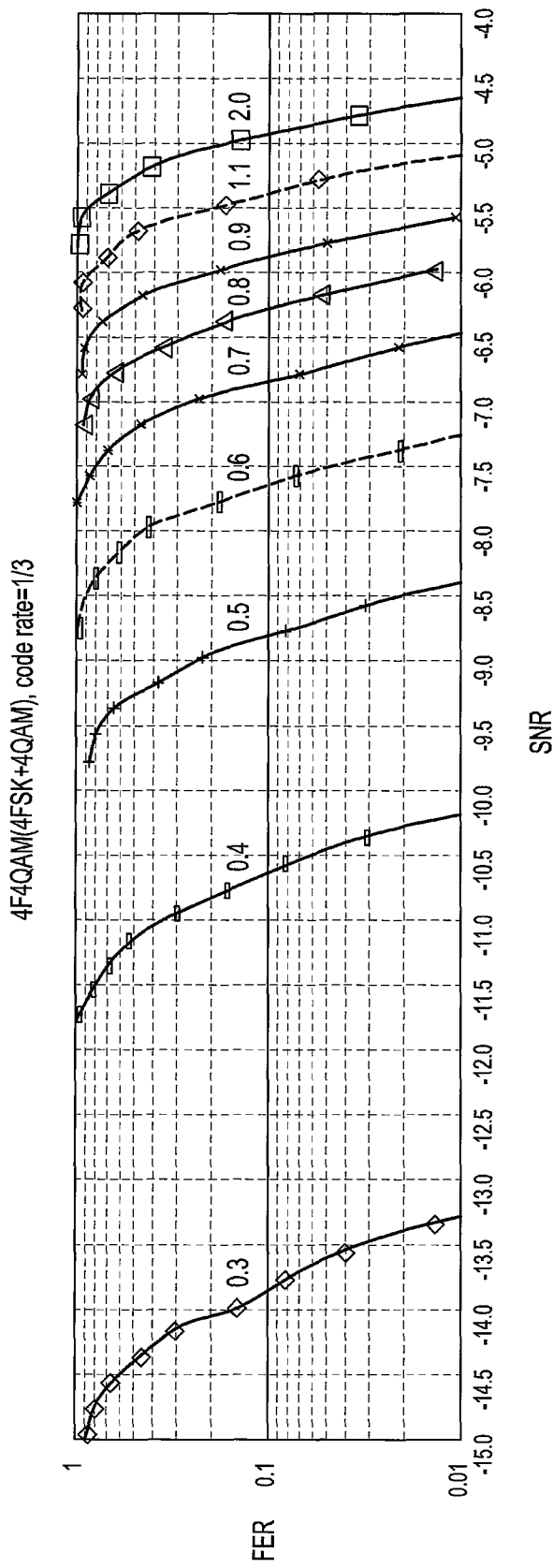
FIG. 2 is a graph illustrating decoding performance according to an α value when a modulation scheme according to an embodiment of the present invention is used in a Complex Generalized Gaussian (CGG) channel.

FIG. 2 is a graph illustrating decoding performance according to an α value when a modulation scheme according to an embodiment of the present invention is used in a Complex Generalized Gaussian (CGG) channel.

Referring to FIG. 2, a horizontal axis of the illustrated graph indicates a Signal to Interference-plus-Noise Ratio (SINR) and a vertical axis indicates a Frame Error Rate (FER). Further, the illustrated graph shows an FER curve when the α value corresponds to, for example, 0.3, 0.4, 0.5, 0.6, 0.7, 0.8, 0.9, 1.1, or 2.0. The α value of the CGG channel may be modeled at a level of the non-Gaussian characteristic of Inter-Cell Interference (ICI) in a multi-cell wireless communication network.

As noted in the illustrated graph, the decoding performance significantly varies depending on the α value even though the applied modulation scheme and the received SINR are constant. Accordingly, in order to acquire high performance of the FQAM technology, a level value of the non-Gaussian characteristic of ICI should be reflected in scheduling. The α value is only an example, which can model a level value of the non-Gaussian characteristic of ICI, but an operation/effect of the present invention will be described using the α value.

Meanwhile, when an α value at a time point when a Mobile Station (MS) reports Channel Quality Information (CQI) and an α value at a time point when a Base Station (BS) transmits data are mismatched, serious system performance deterioration may occur.

For example, when the α value at the time point when the MS reports the CQI is 0.6, the SINR is −7.5 dB, and the BS allocates a modulation scheme in which the 4FSK and the 4QAM are combined and a code rate of 1/3, if the α value at the time point when the BS transmits the data increases to be 1.1, the MS cannot perform a data decoding.

Further, when the α value at the time point when the MS reports the CQI is 1.1, the SINR is −5.2 dB, and the BS allocates a modulation scheme in which the 4FSK and the 4QAM are combined and a code rate of 1/3, if the α value at the time point when the BS transmits the data decreases to be 0.6, system performance deteriorates since a Modulation and Coding Scheme (MCS) having an excessively low bit-rate is allocated. In this case, if a higher code rate is allocated or a modulation scheme in which 2FSK and 8QAM are combined is allocated, the system performance can further increase.

Meanwhile, an inter-cell interference in a multi-cell wireless communication system may be calculated based on Equation 1 below.

$$\Omega_l = \sqrt{I_1}\, H_{l,1} x_1 \delta_{l,m_1} + \sum_{a=2}^{N_{BS}} \sqrt{I_a}\, H_{l,a} x_a \delta_{l,m_a} + \mu_l,$$ [Equation 1]

-continued
$$1 \le l \le M_F$$

$\Omega_l$ denotes a Fast Fourier Transform (FFT) output of a first subcarrier among a total of $M_F$ subcarriers in a corresponding FQAM symbol, and $M_F$ denotes a modulation order of the FSK scheme. $H_{l,a}$ denotes a fading channel coefficient between an $a^{th}$ BS and a specific MS, and a case of a=1 is assumed in Equation 1. $x_a$ denotes a QAM symbol selected from the FQAM symbols transmitted by the $a^{th}$ BS. $m_a$ denotes an index of an active tone boosted through an application of the FQAM scheme among the FQAM symbols transmitted by the $a^{th}$ BS, and a case of $1 \le m_a \le M_F$ is assumed in Equation 1. $I_a$ denotes a pathloss effect between the $a^{th}$ BS and the specific MS, and $\mu_l$ denotes background noise. $N_{BS}$ denotes the number of interference BSs. $\delta_{l,m_a}$ denotes a value defined as 1 in a case of $l=m_a$ and a value defined as 0 in a case of $l \ne m_a$. In order to acquire expected FQAM performance, values of the parameters $N_{BS}$ and $\delta_{l,m_a}$ should be fixed. In order to fix the values of the parameters $N_{BS}$ and $\delta_{l,m_a}$, a frame structure also should be fixed. Further, the BS has to share information related to the fixed frame structure with an adjacent BS.

FIGS. 3A to 3F are graphs illustrating a probability density function with respect to an absolute value of an inter-cell interference sample according to an α value in a multi-cell wireless communication system according to an embodiment of the present invention.

Referring to FIGS. 3A to 3F, it is assumed that the graphs of FIGS. 3A to 3F have three cells and various $M_F$ and $M_Q$. Here, $M_F$ denotes a modulation order of the FSK scheme, and $M_Q$ denotes a modulation order of the QAM scheme. Further, a horizontal axis of the illustrated graph indicates an absolute value of an ICI sample and a vertical axis indicates a probability density function (pdf).

Figure 3A:
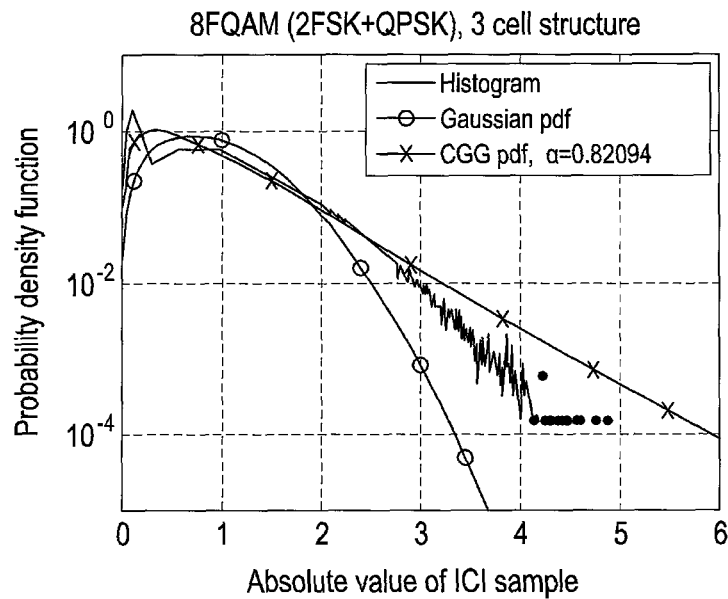
FIGS. 3A to 3F are graphs illustrating a probability density function with respect to an absolute value of an inter-cell interference sample according to an α value in a multi-cell wireless communication system according to an embodiment of the present invention.

The graph of FIG. 3A shows a histogram of ICI in a case where an 8FQAM scheme in which 2FSK and Quadrature Phase Shift Keying (QPSK) are combined is applied, a Gaussian pdf having a variance value, which is the same as that of variance of ICI, and an average value of 0, and a CGG pdf made through estimation of α (alpha) and β (beta) values from ICI. In this case, the ICI is modeled by the CGG distribution having the α value of about 0.82094. Here, the α value may be estimated by Equation 2 below.

$$\hat{\alpha} = \frac{\ln(3^6/2^{10})}{\ln\left(\frac{\left(\frac{1}{N_s}\Sigma|Z[k]|\right)^2}{\left(\frac{1}{N_s}\Sigma|Z[k]|\right)^2} - \pi/4 + 3^2/2^{3.5}\right) + \ln(3/2\sqrt{2})}$$ [Equation 2]

Figure 3B:
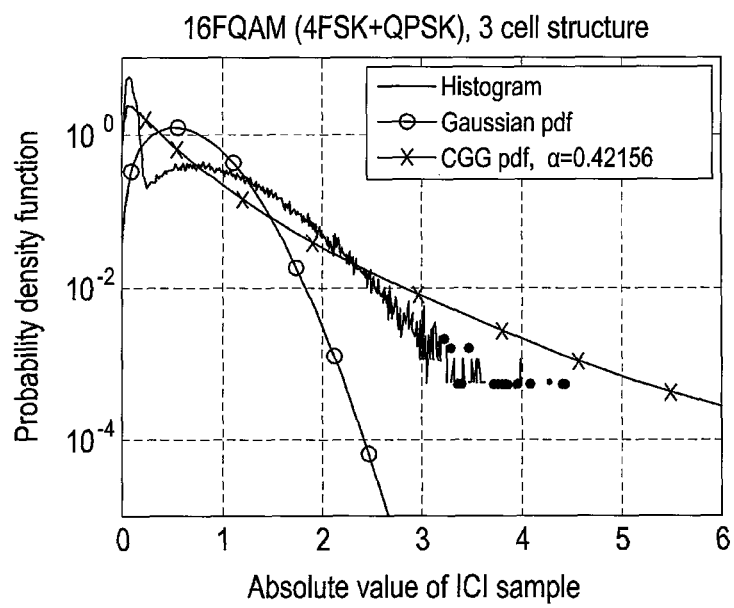

The graph of FIG. 3B shows a histogram of ICI in a case where a 16FQAM scheme in which 4FSK and QPSK are combined is applied, a Gaussian pdf having a variance value, which is the same as that of variance of ICI, and an average value of 0, and a CGG pdf made through estimation of α and β values from ICI. In this case, the ICI is modeled by the CGG distribution having the α value of about 0.42156.

Figure 3C:
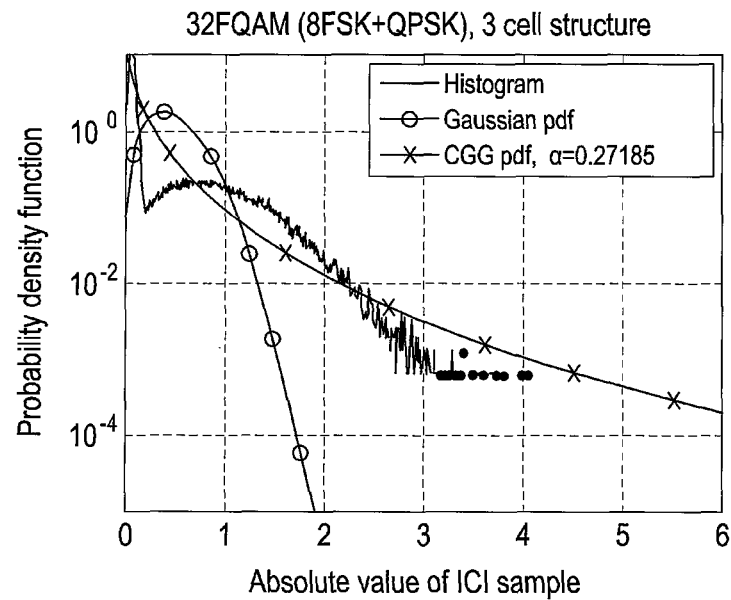

The graph of FIG. 3C shows a histogram of ICI in a case where a 32FQAM scheme in which 8FSK and QPSK are combined is applied, a Gaussian pdf having a variance value, which is the same as that of variance of ICI, and an average value of 0, and a CGG pdf made through estimation of α and β values from ICI. In this case, the ICI is modeled by the CGG distribution having the α value of about 0.27185.

Figure 3D:
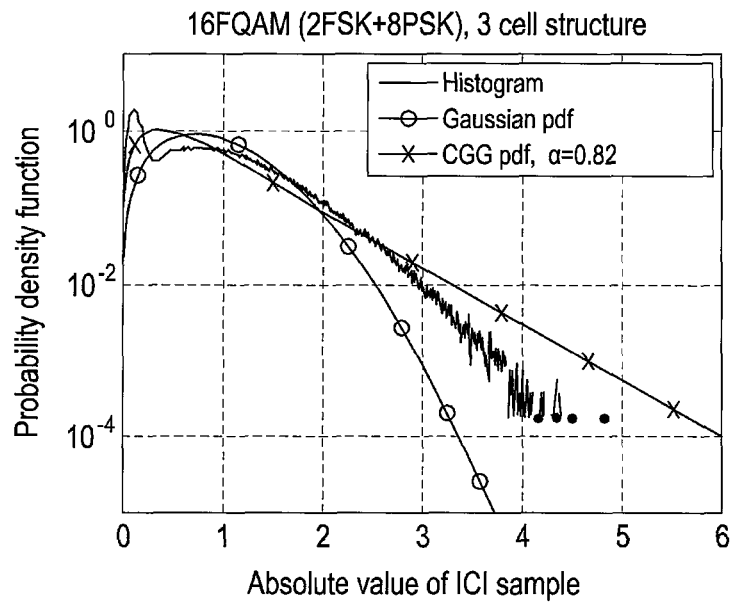

The graph of FIG. 3D shows a histogram of ICI in a case where a 16FQAM scheme in which 2FSK and 8PSK are combined is applied, a Gaussian pdf having a variance value, which is the same as that of variance of ICI, and an average value of 0, and a CGG pdf made through estimation of α and β values from ICI. In this case, the ICI is modeled by the CGG distribution having the α value of about 0.82.

Figure 3E:
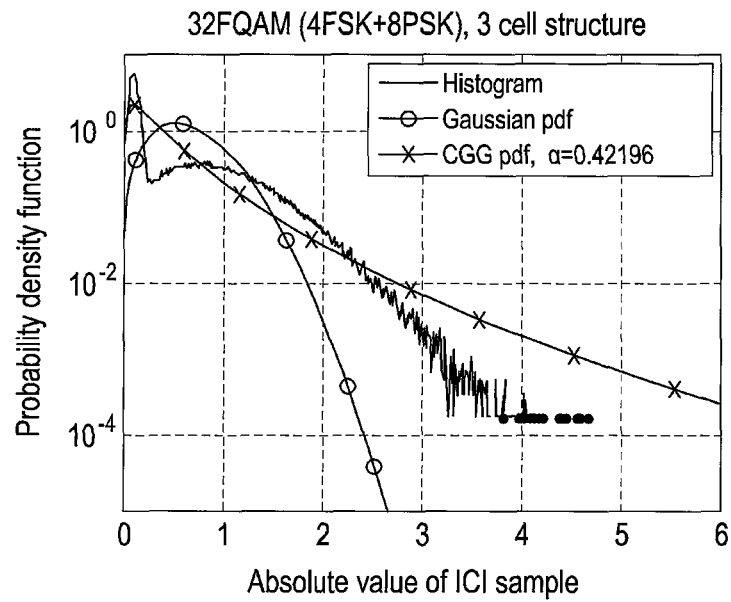

The graph of FIG. 3E shows a histogram of ICI in a case where a 32FQAM scheme, in which 4FSK and 8PSK are combined, is applied, a Gaussian pdf having a variance value, which is the same as that of variance of ICI, and an average value of 0, and a CGG pdf made through estimation of α and β values from ICI. In this case, the ICI is modeled by the CGG distribution having the α value of about 0.42196.

Figure 3F:
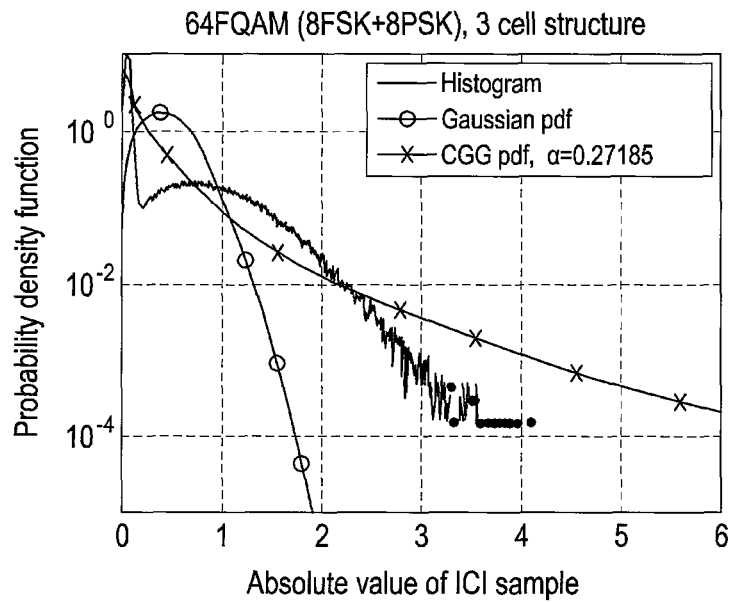

The graph of FIG. 3F shows a histogram of ICI in a case where a 64FQAM scheme in which 8FSK and 8PSK are combined is applied, a Gaussian pdf having a variance value, which is the same as that of variance of ICI, and an average value of 0, and a CGG pdf made through estimation of α and β values from ICI. In this case, the ICI is modeled by the CGG distribution having the α value of about 0.27185.

As noted in the graphs illustrated in FIGS. 3A to 3F, the modulation order of the FSK scheme among the applied modulation schemes significantly influences the α value.

Figure 4:
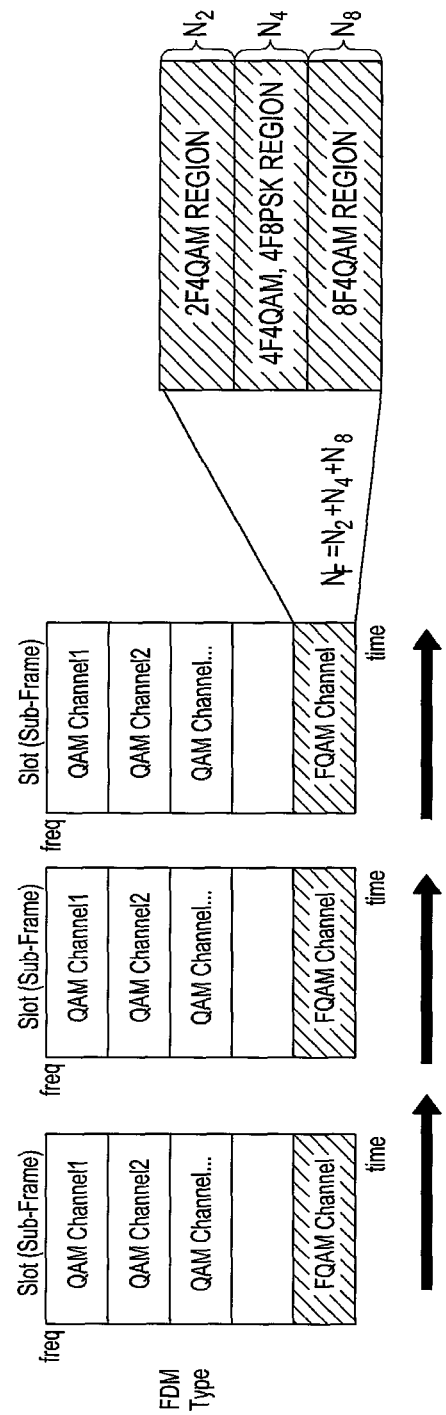
FIG. 4 illustrates an example of a frame structure in which an FQAM channel is allocated in the unit of frequencies in a wireless communication system according to an embodiment of the present invention.

FIG. 4 illustrates an example of a frame structure in which a FQAM channel is allocated in the unit of frequencies in a wireless communication system according to an embodiment of the present invention.

Referring to FIG. 4, a Frequency Division Multiplexing (FDM) type frame structure to allow adjacent cells to transmit FQAM signals having the same $M_F$ value in the same resource regions is defined.

In the resource region of each of the illustrated consecutive slots (or sub frames), a plurality of channels, for example, QAM channel 1, QAM channel 2, . . . , a FQAM channel are allocated to a frequency axis. Further, the resource region to which the FQAM channel is allocated is divided into a plurality of regions according to a modulation order of the FSK scheme. That is, the resource region to which the FQAM channel is allocated is divided into an $N_2$ region to which a modulation scheme in which 2FSK and 4QAM are combined is allocated, an $N_4$ region to which a modulation, in which 4FSK and 4QAM are combined, and a modulation scheme, in which 4FSK and 8FSK are combined, are allocated, and an $N_8$ region to which a modulation scheme, in which 8FSK and 4QAM are combined, is allocated.

Accordingly, FQAM signals having the same $M_F$ value are transmitted in the same resource regions, that is, the $N_2$ regions, the $N_4$ regions, or the $N_8$ regions of the resource regions to which the FQAM channels of respective slots are allocated.

Further, although FIG. 4 illustrates slots operated in one cell for convenience, slots having the same structure as the illustrated structure may be operated in adjacent cells. Accordingly, FQAM signals having the same $M_F$ value are also transmitted in the same resource regions, that is, the $N_2$ regions, the $N_4$ regions, or the $N_8$ regions of the resource regions to which the FQAM channels of respective slots operated in the adjacent cell are allocated FIG. 5 illustrates an example of a frame structure in which a FQAM channel is allocated in the unit of time in a wireless communication system according to an embodiment of the present invention.

Figure 5:
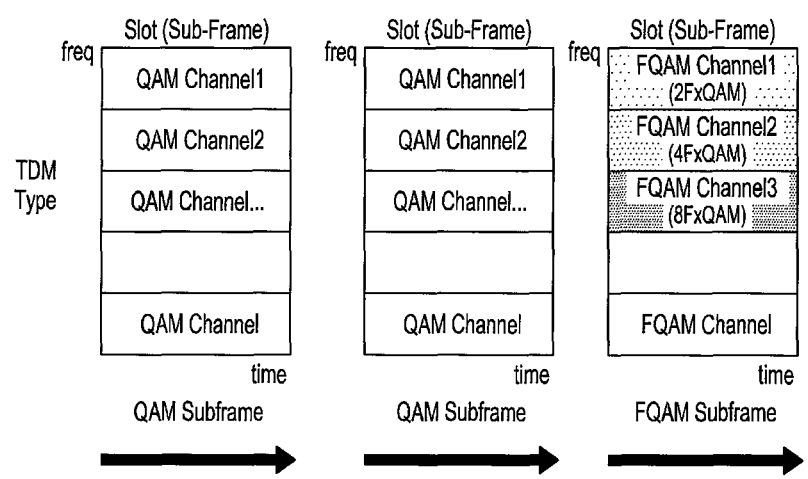
FIG. 5 illustrates an example of a frame structure in which an FQAM channel is allocated in the unit of time in a wireless communication system according to an embodiment of the present invention.

Referring to FIG. 5, a Time Division Multiplexing (TDM) type frame structure to allow adjacent cells to transmit FQAM signals having the same $M_F$ value in the same resource regions is defined.

In the resource region of each of the consecutive slots (or sub frames), a QAM channel or a FQAM channel is allocated to a time axis. That is, QAM channels or FQAM channels are allocated to entire slots.

Further, the resource region (FQAM sub frame) to which the FQAM channel is allocated is divided into a plurality of regions according to a modulation order of the FSK scheme. That is, the FQAM sub frame is divided into an FQAM channel 1 region to which a modulation scheme in which 2FSK and QAM are combined is allocated, an FQAM channel 2 region to which a modulation scheme in which 4FSK and QAM are combined is allocated, and an FQAM channel 3 region to which a modulation scheme in which 8FSK and QAM are combined is allocated.

Accordingly, the FQAM signal having the same $M_F$ value is transmitted in each of the FQAM channel 1 region, the FQAM channel 2 region, and the FQAM channel 3 region of the FQFAM sub frame.

Further, although FIG. 5 illustrates slots operated in one cell for convenience, slots having the same structure as the illustrated structure may be operated in adjacent cells. Accordingly, FQAM signals having the same $M_F$ value are also transmitted in the same resource regions, that is, the FQAM channel 1 regions, the FQAM channel 2 regions, and the FQAM channel 3 regions of the resource regions to which the FQAM channels of respective slots operated in the adjacent cell are allocated.

FIGS. 4 and 5 have described, as an example, the FDM type frame structure in which the FQAM channel is allocated in the unit of frequencies and the TDM type frame structure in which the FQAM channel is allocated in the unit of time. However, the FQAM channel may be allocated in consideration of both the frequency and time, and a frame structure in which the FQAM channel is allocated in consideration of both the frequency and time is defined as a mixed type frame structure in which the FDM type and the TDM type is combined.

Meanwhile, the frame structures illustrated in FIGS. 4 and 5 should be delivered to the MS by the BS or a higher entity. Hereinafter, an example of delivering resource allocation information on the frame structure will be described in more detail through FIG. 6.

FIG. 6 illustrates an example of resource allocation information, which the BS or a higher entity delivers to the MS in a wireless communication system, according to an embodiment of the present invention.

Referring to FIG. 6, a Long Term Evolution (LTE) system is assumed, and the BS or the higher entity delivers resource allocation information on the FQAM channel region (or FQAM band), to which the FQAM channel is allocated in the FDM type, to the MS through a resource allocation type 1 method.

The resource allocation information includes configuration information and location information on the FQAM band, and the configuration information on the FQAM band includes, for example, at least one piece of information related to an FQAM band allocation type, that is, information related to the TDM type, the FDM type, or the mixed type, information related to the number of FQAM bands corresponding to the number of considered $M_F$, and information related to the number of Resource Blocks (RBs) corresponding to each FQAM band. Further, the location information on the FQAM band may include, for example, at least one piece of information related to a bit-map and information indicating a start point and an end point of the FQAM band.

Figure 6A:
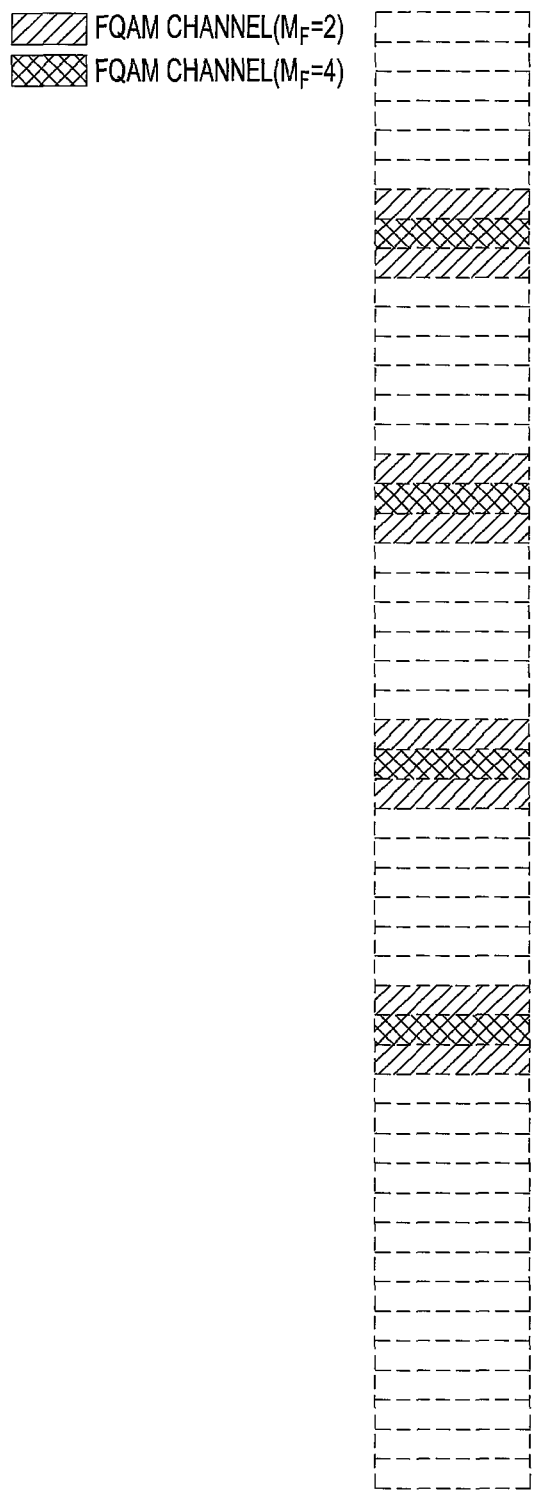
FIG. 6 illustrates an example of resource allocation information, which a BS or a higher entity delivers to an MS in a wireless communication system, according to an embodiment of the present invention.

When it is assumed that FQAM channels having $M_F$ of 2 and FQAM channels having $M_F$ of 4 are allocated to a total of 50 RBs as illustrated in FIG. 6A, the BS or higher entity may configure resource allocation information in a bit-map form and deliver the resource allocation information in the bit-map form to the MS. That is, when the FQAM channels having $M_F$ of 2 are allocated to a total of 50 RBs, the BS or higher entity may configure the resource allocation information as "101010110110110100" and deliver the resource allocation information of "101010110110110100" to the MS. Further, when the FQAM channels having $M_F$ of 4 are allocated to a total of 50 RBs, the BS or higher entity may configure the resource allocation information as "101001001001001000" and deliver the resource allocation information of "101001001001001000" to the MS. At this time, a first bit among the bits consisting of the resource allocation information indicates type information, a second bit indicates offset information, a third bit and a fourth bit indicate subset information, and the remaining bits (14 bits) indicate bit mapping information.

Figure 6B:
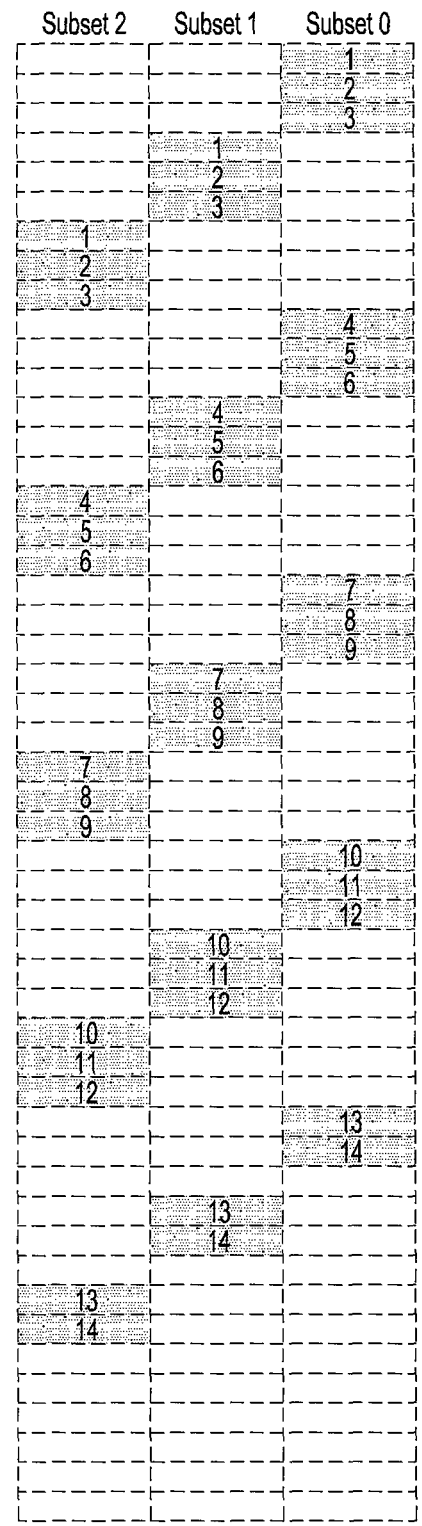

Further, FIG. 6A illustrates, as an example, a case where a bit value of the bits indicating the subset information is "10", that is, a case where the FQAM channels are allocated in a form of subset 2 of FIG. 6B. However, the FQAM channels may be allocated in the form of subset 1 or subset 0 of FIG. 6B according to the bit value of the bits indicating the subset information.

Figure 7:
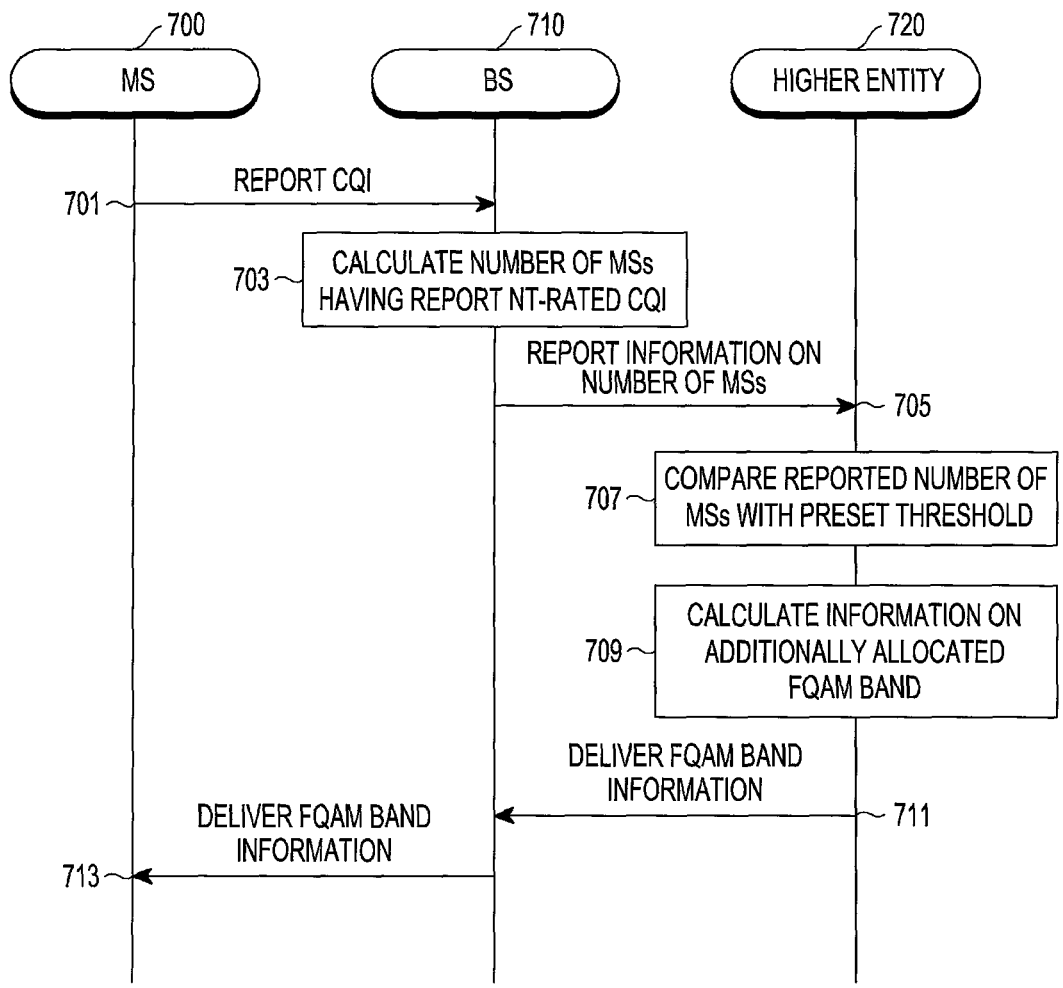
FIG. 7 illustrates an example of an operation for delivering resource allocation information to the MS in a wireless communication system according to an embodiment of the present invention.

FIG. 7 illustrates an example of an operation for delivering resource allocation information to the MS in a wireless communication system according to an embodiment of the present invention.

Referring to FIG. 7, the wireless communication system includes an MS 700, a BS 710, and a higher entity 720 that manages a sub group including a plurality of BSs. Further, it is assumed that the MS 700, the BS 710, and the higher entity 720 operate only through a QAM scheme.

The MS 700 reports its own CQI to the BS 710 in step 701. Although FIG. 7 illustrates only one MS 700 for convenience, the BS 710 actually receives CQI reported by all MSs within a cell managed by the BS itself. The BS 710 calculates the number of MSs having reported Non-Transmission (NT)-rated CQI based on the CQI reported by the MSs in step 703. Here, the NT rating corresponds to information indicating that a channel state is equal to or lower than a preset state. For example, an NT 1 rating includes information informing to not transmit data to an MS having a poor channel state. At this time, the MS 700 may also transmit an α value along with the report on the CQI to the BS 710. Thereafter, the BS 710 reports information related to the number of MSs calculated in step 703 to the higher entity 720 in step 705, and the higher entity 720 compares the reported number of MSs with a preset threshold in step 707. Although FIG. 7 illustrates only one BS 710 for convenience, the higher entity 720 actually receives reports on information related to the number of MSs corresponding to the NT rating from all BSs within the sub group managed by the higher entity itself and compares the reported total number of MSs with the preset threshold.

In FIG. 7, a case where the reported total number of MSs is larger than or equal to the preset threshold is assumed and described. That is, since the reported total number of MSs is larger than or equal to the preset threshold based on a result of the comparison, the higher entity 720 additionally allocates the FQAM band to the MSs and calculates information on the additionally allocated FQAM band, that is, configuration information and location information on the FQAM band in step 709. Here, the configuration information includes at least one piece of information related to an FQAM band allocation type, that is, information related to the TDM type, the FDM type, or the mixed type, information related to the number of FQAM bands corresponding to the number of considered $M_F$, and information related to the number of Resource Blocks (RBs) corresponding to each FQAM band, and the location information on the FQAM channel region includes, for example, at least one piece of information related to a bit-map and information indicating a start point and an end point of the FQAM band.

Then, the higher entity 720 delivers the FQAM band information calculated in step 709 to the BS 710 in step 711, and the BS 710 delivers the FQAM band information to the MS 700 in step 713. At this time, the BS 710 may broadcast the configuration information and the location information on the FQAM band through a System Information Block (SIB) or unicast the configuration information and the location information on the FQAM band through a Physical Downlink Control Channel (PDCCH).

Figure 8:
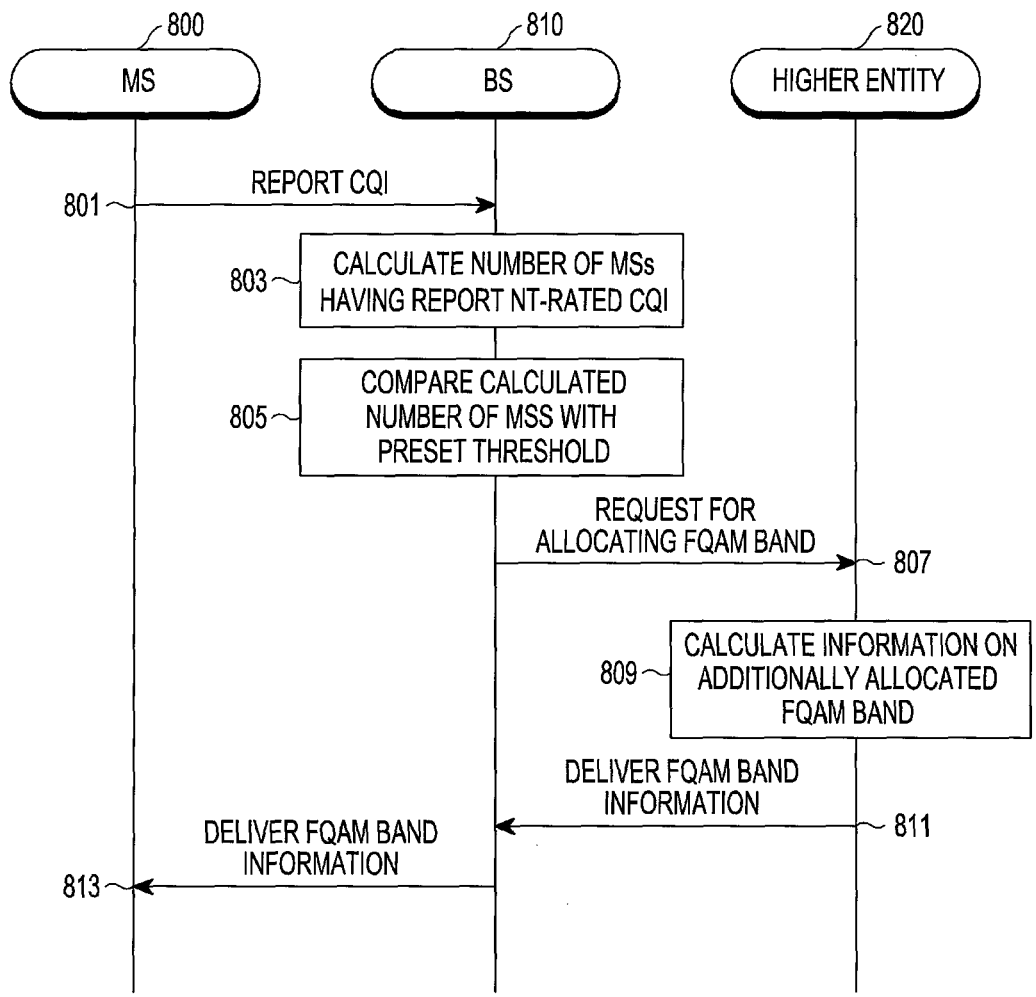
FIG. 8 illustrates an example of an operation for delivering resource allocation information to the MS in a wireless communication system according to another embodiment of the present invention.

FIG. 8 illustrates an example of an operation for delivering resource allocation information to the MS in a wireless communication system according to another embodiment of the present invention.

Referring to FIG. 8, the wireless communication system includes an MS 800, a BS 810, and a higher entity 820 that manages a sub group including a plurality of BSs. Further, it is assumed that the MS 800, the BS 810, and the higher entity 820 operate only through a QAM scheme.

The MS 800 reports its own CQI to the BS 810 in step 801. Although FIG. 8 illustrates only the MS 800 for convenience, the BS 810 actually receives CQI reported by all MSs within the cell managed by the BS itself. The BS 810 calculates the number of MSs having reported NT-rated CQI based on the CQI reported by the MSs in step 803. Here, the NT rating corresponds to information indicating that a channel state is equal to or lower than a preset state. For example, an NT 1 rating includes information informing to not transmit data to an MS having a poor channel state. At this time, the MS 800 may also transmit an α value along with the report on the CQI to the BS 810.

Thereafter, the BS 810 compares the number of MSs calculated in step 803 with a preset threshold in step 805. In FIG. 8, a case where the calculated number of MSs is larger than or equal to the preset threshold is assumed and described. That is, since the calculated number of MSs is larger than or equal to the preset threshold based on a result of the comparison, the BS 810 makes a request for allocating the FQAM band to the higher entity 820 in step 807.

The higher entity 820 additionally allocates the FQAM band to the MSs according to the request and calculates information on the additionally allocated FQAM band, that is, configuration information and location information on the FQAM band in step 809. Here, the configuration information includes at least one piece of information related to an FQAM band allocation type, that is, information related to the TDM type, the FDM type, or the mixed type, information related to the number of FQAM bands corresponding to the number of considered $M_F$, and information related to the number of Resource Blocks (RBs) corresponding to each FQAM band, and the location information on the FQAM channel region includes, for example, at least one piece of information related to a bit-map and information indicating a start point and an end point of the FQAM band.

Then, the higher entity 820 delivers the FQAM band information calculated in step 809 to the BS 810 in step 811, and the BS 810 delivers the FQAM band information to the MS 800 in step 813. At this time, the BS 810 may broadcast the configuration information and the location information on the FQAM band through an SIB or unicast the configuration information and the location information on the FQAM band through a PDCCH.

Figure 9:
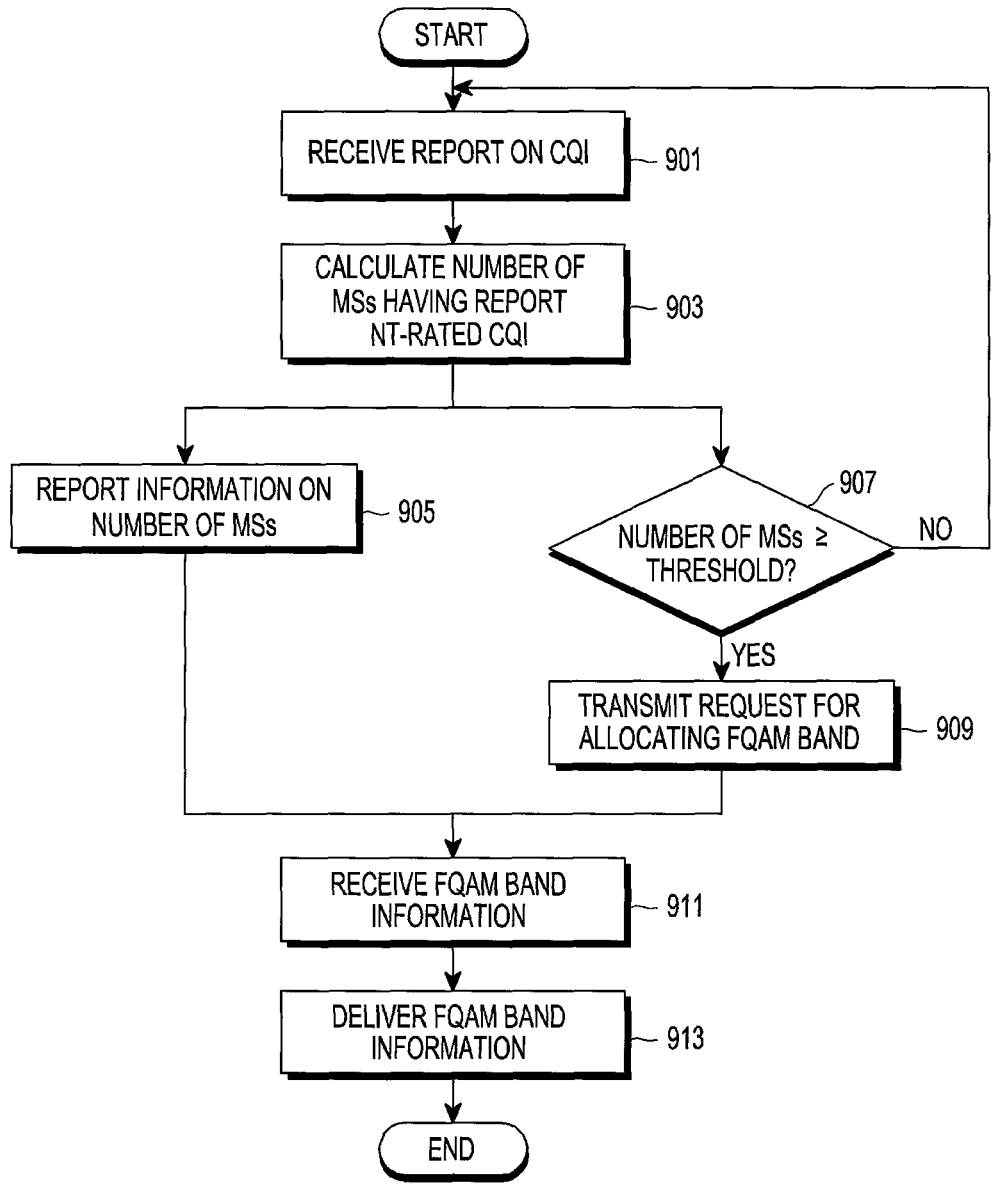
FIG. 9 is a flowchart illustrating a process in which the BS delivers resource allocation information to the MS in a wireless communication system according to an embodiment of the present invention.

FIG. 9 is a flowchart illustrating a process in which the BS delivers resource allocation information to the MS in a wireless communication system according to an embodiment of the present invention.

Referring to FIG. 9, in step 901, the BS receives reports on CQI from all MSs within the cell managed by the BS itself. The BS calculates the number of MSs having reported NT-rated CQI based on the CQI reported by the MSs in step 903, and performs the following operation according to the embodiment of the present invention described through FIG. 7 or the other embodiment of the present invention described through FIG. 8.

The BS, according to an embodiment of the present invention, proceeds to step 905 and reports information on the calculated number of MSs to the higher entity that manages a sub group that includes a plurality of BSs. In step 911, the BS receives information on the FQAM band allocated to the MS, that is, configuration information and location information on the FQAM band from the higher entity. In step 913, the BS delivers the received configuration information and location information on the FQAM band to the MS.

The BS, according to another embodiment of the present invention, proceeds to step 907 and identifies whether the calculated number of MSs is larger than or equal to a preset threshold and, when the number of MSs is larger than or equal to the threshold, proceeds to step 909. In step 909, the BS transmits a request for allocating additional FQAM band to the higher entity. However, when the number of MSs is smaller than the threshold, the BS proceeds to step 901 and receives reports on CQI from the MSs. Thereafter, in step 911, the BS receives information on the FQAM band allocated to the MS, that is, configuration information and location information on the FQAM band from the higher entity. In step 913, the BS delivers the received configuration information and location information on the FQAM band to the MS.

Figure 10:
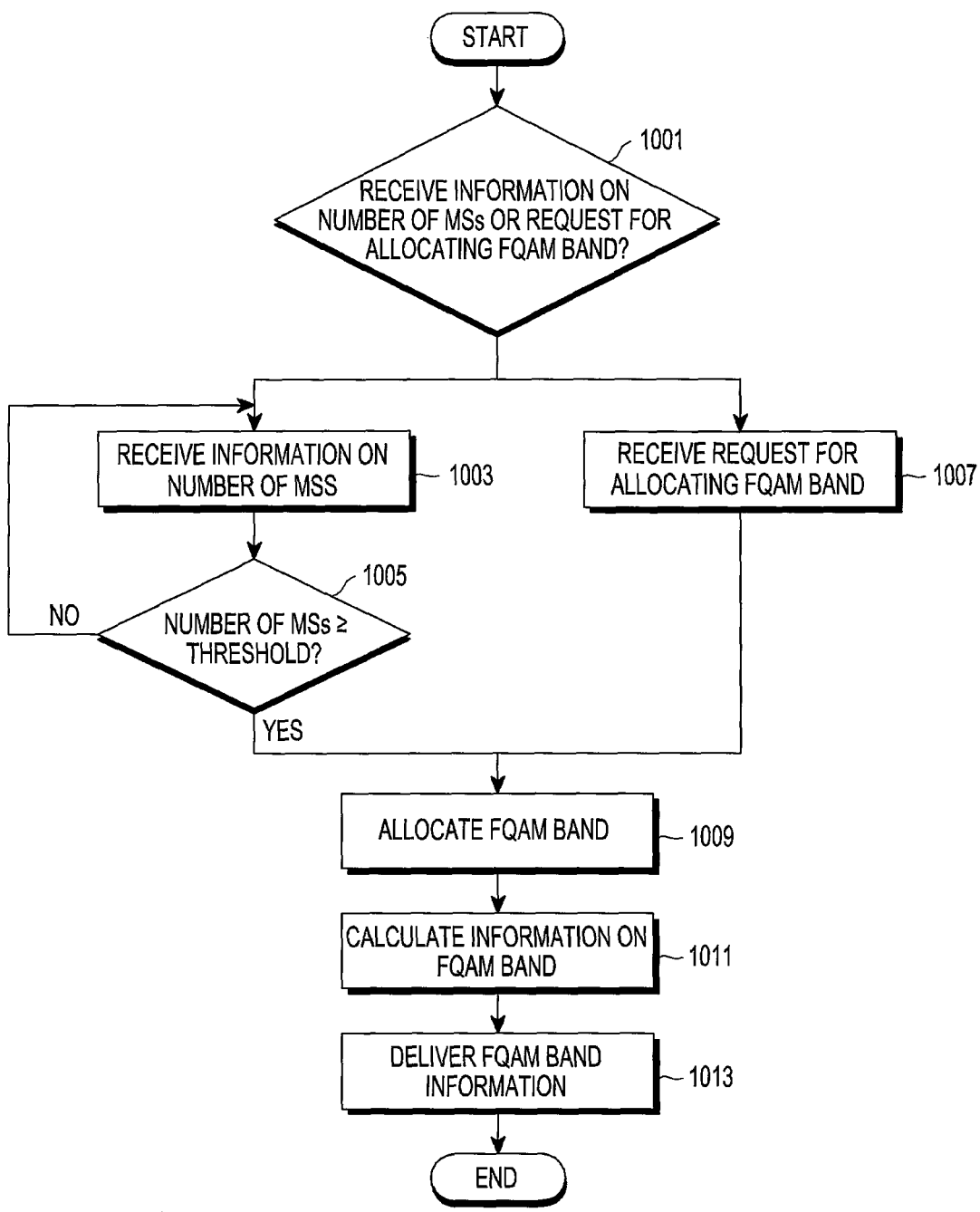
FIG. 10 is a flowchart illustrating a process in which the higher entity delivers resource allocation information to the MS in a wireless communication system according to an embodiment of the present invention.

FIG. 10 is a flowchart illustrating a process in which the higher entity delivers resource allocation information to the MS in a wireless communication system according to an embodiment of the present invention.

Referring to FIG. 10, the higher entity that manages a sub group that includes a plurality of BSs identifies whether information on the number of MSs or an FQAM band allocation request is received from the BS in step 1001 and, when the information on the number of MSs is received according to the embodiment of the present invention described through FIG. 7, proceeds to step 1003. Further, when the FQAM band allocation request is received according to the other embodiment of the present invention described through FIG. 8, the BS proceeds to step 1007.

The higher entity, according to an embodiment of the present invention, receives the information on the number of MSs in step 1003 and identifies whether the reported number of MSs is larger than or equal to a preset threshold in step 1005. When the number of MSs is larger than or equal to the threshold, the higher entity allocates an additional FQAM band to the MS in step 1009. However, when the number of MSs is smaller than the threshold, the higher entity receives information on the number of MSs from the BS in step 1003. Thereafter, the higher entity calculates information on the additionally allocated FQAM band, that is, configuration information and location information on the FQAM band in step 1011, and delivers the calculated FQAM band information to the BS in step 1013.

The higher entity, according to another embodiment of the present invention, receives an FQAM band allocation request in step 1007, and allocates the additional FQAM band to the MS in response to the request in step 1009. The higher entity calculates information on the additionally allocated FQAM band, that is, configuration information and location information on the FQAM band in step 1011, and delivers the calculated FQAM band information to the BS in step 1013.

Figure 11:
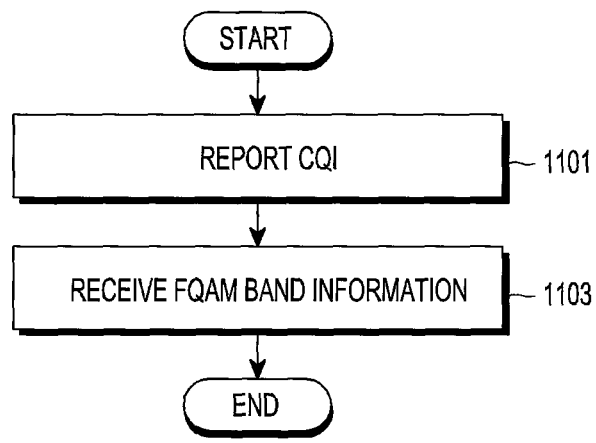
FIG. 11 is a flowchart illustrating a process in which the MS receives resource allocation information in a wireless communication system according to an embodiment of the present invention.

FIG. 11 is a flowchart illustrating a process in which the MS receives resource allocation information in a wireless communication system according to an embodiment of the present invention.

Referring to FIG. 11, the MS reports its own CQI to the BS in step 1101, and receives information on an additionally allocated FQAM band, that is, configuration information and location information on the FQAM band from the BS in step 1103.

Figure 12:
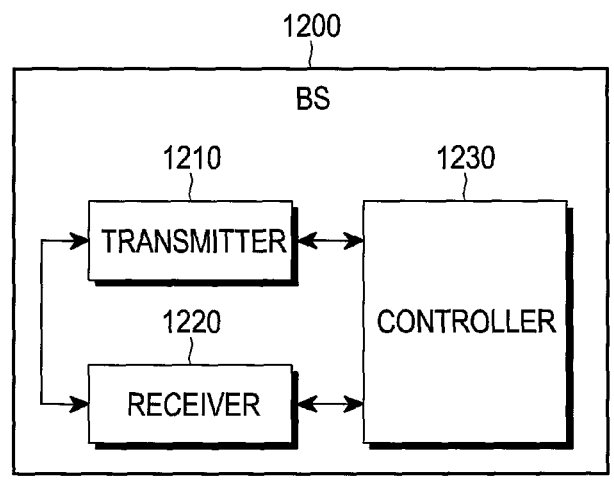
FIG. 12 illustrates a BS apparatus that delivers resource allocation information to the MS in a wireless communication system according to an embodiment of the present invention.

FIG. 12 illustrates a BS apparatus that delivers resource allocation information to the MS in a wireless communication system according to an embodiment of the present invention.

Referring to FIG. 12, a BS 1200 includes a transmitter 1210, a receiver 1220, and a controller 1230.

The receiver 1220 of the BS 1200 receives reports on CQI from all MSs within the cell managed by the BS itself and transfers the reports on the CQI to the controller 1230. The controller 1230 calculates the number of MSs having reported NT-rated CQI based on the reported CQI.

The controller 1230 reports information on the calculated number of MSs to the higher entity that manages a sub group including a plurality of BSs through the transmitter 1210. Alternatively, the controller 1230 identifies whether the calculated number of MSs is larger than or equal to a preset threshold and, when the number of MSs is larger than or equal to the threshold, makes a request for allocating an additional FQAM band to the higher entity through the transmitter 1210. When the number of MSs is smaller than the preset threshold, the controller 1230 receives reports on CQI from the MSs through the receiver 1220.

Further, the receiver 1220 of the BS 1200 receives information on the allocated FQAM band, that is, configuration information and location information on the FQAM band from the higher entity, and the BS 1200 delivers the received FQAM band information to the MS through the transmitter 1210.

Figure 13:
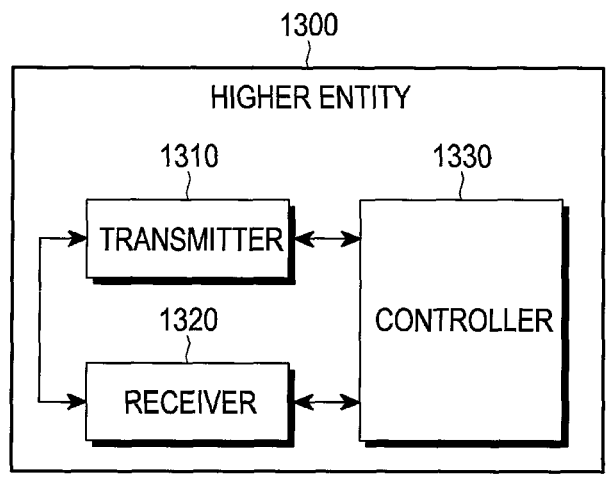
FIG. 13 illustrates a higher entity apparatus that delivers resource allocation information to the MS in a wireless communication system according to an embodiment of the present invention.

FIG. 13 illustrates a higher entity apparatus that delivers resource allocation information to the MS in a wireless communication system according to an embodiment of the present invention.

Referring to FIG. 13, a higher entity 1300, which manages a sub group including a plurality of BSs, includes a transmitter 1310, a receiver 1320, and a controller 1330.

When information on the number of MSs is received from the BS, the receiver 1320 of the higher entity 1300 identifies whether the number of MSs indicated by the information on the number of MSs is larger than or equal to a preset threshold through the controller 1330. When the number of MSs is larger than or equal to the threshold, the controller 1330 allocates an additional FQAM band to the MS. When the number of MSs is smaller than the threshold, the higher entity 1300 receives the information on the number of MSs from the BS through the receiver 1320.

Alternatively, when an FQAM band allocation request is received from the BS, the receiver 1320 allocates the additional FQAM band to the MS through the controller 1330 according to the request.

Further, the controller 1330 of the BS calculates information on the additionally allocated FQAM band, that is, configuration information and location information on the FQAM band, and delivers the calculated FQAM band information to the BS through transmitter 1310.

Figure 14:
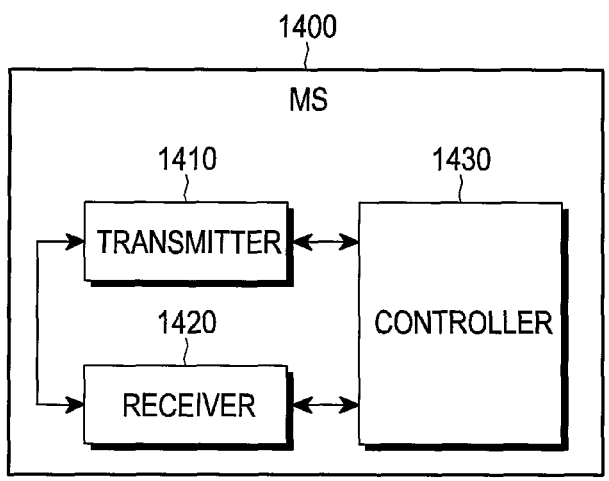
FIG. 14 illustrates an MS apparatus that receives resource allocation information in a wireless communication system according to an embodiment of the present invention.

FIG. 14 illustrates an MS apparatus that receives resource allocation information in a wireless communication system according to an embodiment of the present invention.

Referring to FIG. 14, an MS 1400 includes a transmitter 1410, a receiver 1420, and a controller 1430.

The MS 1400 reports its own CQI to the BS through the transmitter 1101, and receives information on an additionally allocated FQAM band, that is, configuration information and location information on the FQAM band from the BS through the receiver 1420. Further, the controller 1430 of the MS 1400 controls signaling of the transmitter 1401 and the receiver 1420.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Further, it may be understood that a method and apparatus for allocating a channel using multiple modulation schemes according to an embodiment of the present disclosure can be implemented in the form of hardware, software, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. The method for allocating a channel using multiple modulation schemes of the present disclosure can be implemented by a computer or a portable terminal, which includes a controller and a memory, and it can be understood that the memory corresponds to an example of the machine readable storage medium which is suitable for storing a program or programs including instructions by which the embodiments of the present disclosure are implemented.

Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

Further, a method and apparatus for allocating a channel using multiple modulation schemes according to the embodiment of the present disclosure may receive the program from a program providing apparatus connected to the apparatus wirelessly through a wire and store the received program. The program supply apparatus may include a program that includes instructions to execute the exemplary embodiments of the present disclosure, a memory that stores information or the like required for the exemplary embodiments of the present disclosure, a communication unit that conducts wired or wireless communication with the electronic apparatus, and a control unit that transmits a corresponding program to a transmission/reception apparatus in response to the request from the electronic apparatus or automatically.

The invention claimed is:

1. A method of operating a plurality of modulation schemes by a base station (BS) in a wireless communication system, the method comprising:
   identifying a number of at least one mobile station (MS) having a channel state equal to or lower than a preset state from among a plurality of MSs within a cell managed by the BS; and
   if it is determined that the number of the at least one MS is larger than or equal to a present threshold, receiving information related to a band for a hybrid frequency shift keying (FSK) and a quadrature amplitude modulation (QAM) modulation (FQAM) scheme based on a QAM scheme and a FSK scheme from a network entity and transmitting the information related to the band for the FQAM scheme to the at least one MS.

2. The method of claim 1, further comprising:
   comparing the number of the at least one MS with a preset threshold; and
   if the number of the at least one MS is larger than or equal to the preset threshold, transmitting a request for allocating the band for the FQAM scheme to the network entity.

3. The method of claim 1, wherein:
   the band for the FQAM scheme is allocated to equal frequency regions or equal time regions of adjacent cells,
   the band for the FQAM scheme is divided into a plurality of regions based on a modulation order of the FSK scheme, and
   an FQAM signal comprising an equal modulation order of the FSK scheme is transmitted in each of the plurality of regions.

4. The method of claim 1, wherein the information related to the band for the FQAM scheme comprises at least one of information related to an allocation type of the band for the FQAM scheme, information related to a number of bands for the FQAM scheme related to a modulation order of the FSK scheme, information related to a number of resource blocks (RBs) related to each band for the FQAM scheme, information related to a bit-map indicating a location of the band for the FQAM scheme, or information indicating a start point and an end point of the band for the FQAM scheme.

5. The method of claim 4, wherein the information related to the allocation type of the band for the FQAM scheme comprises information related to one of a time division multiplexing (TDM) type in which the band for the FQAM scheme is allocated to a time axis, a frequency division multiplexing (FDM) type in which the band for the FQAM scheme is allocated to a frequency axis, and a mixed type in which the TDM type and the FDM type is mixed.

6. The method of claim 1, further comprising receiving an α value indicating a level of a non-Gaussian characteristic of inter-cell interference (ICI) from the the plurality of MSs.

7. The method of claim 1, wherein the information related to the band for the FQAM scheme is transmitted based on a system information block (SIB) or a physical downlink control channel (PDCCH).

8. A method of operating a plurality of modulation schemes by a network entity in a wireless communication system, the method comprising:
receiving information related to a number of at least one mobile station (MS) having a channel state equal to or lower than a preset state from among a plurality of MSs within a cell managed by a base station (BS) from the BS; and
if it is determined that the number of the at least one MS is larger than or equal to a preset threshold, transmitting information related to a band for a hybrid frequency shift keying (FSK) and a quadrature amplitude modulation (QAM) modulation (FQAM) scheme based on a QAM scheme and a FSK scheme to the BS.

9. The method of claim 8, wherein transmitting the information related to the band comprises: comparing the number of the at least one MS indicated by the information related to the number of the at least one MS, with the preset threshold; and
if the number of the at least one MS is larger than or equal to the preset threshold, transmitting the information related to the band.

10. The method of claim 8, wherein the band for the FQAM scheme is allocated to equal frequency regions or equal time regions of adjacent cells, the band for the FQAM scheme is divided into a plurality of regions based on a modulation order of the FSK scheme, and an FQAM signal comprising an equal modulation order of the FSK scheme is transmitted in each of the plurality of regions.

11. The method of claim 8, wherein the information related to the band for the FQAM scheme comprises at least one of information related to an allocation type of the band for the FQAM scheme, information related to a number of bands for the FQAM scheme related to a modulation order of the FSK scheme, information related to a number of resource blocks (RBs) related to each band for the FQAM scheme, information related to a bit-map indicating a location of the band for the FQAM scheme, or information indicating a start point and an end point of the band for the FQAM scheme.

12. The method of claim 11, wherein the information related to the allocation type of the band for the FQAM scheme comprises information related to one of a time division multiplexing (TDM) type in which the band for the FQAM scheme is allocated to a time axis, a frequency division multiplexing (FDM) type in which the band for the FQAM scheme is allocated to a frequency axis, and a mixed type in which the TDM type and the FDM type is mixed.

13. A method of operating a plurality of modulation schemes by a mobile station (MS) in a wireless communication system, the method comprising:
reporting channel state information related to the MS to a base station (BS), wherein the channel state information related to the MS is for use in identifying a number of at least one MS having a channel state equal to or lower than a preset state from among a plurality of MSs within a cell managed by the BS; and
if it is determined that the number of the at least one MS is larger than or equal to a preset threshold, receiving information related to a band for a hybrid frequency shift keying (FSK) and quadrature amplitude modulation (QAM) modulation (FQAM) scheme based on a QAM scheme and a FSK scheme from the BS.

14. The method of claim 13, wherein the band for the FQAM scheme is allocated to equal frequency regions or equal time regions of adjacent cells, the band for the FQAM scheme is divided into a plurality of regions based on a modulation order of the FSK scheme, and an FQAM signal comprising an equal modulation order of the FSK scheme is transmitted in each of the plurality of regions.

15. The method of claim 13, wherein the information related to the band for the FQAM scheme comprises at least one of information related to an allocation type of the band for the FQAM scheme, information related to a number of bands for the FQAM scheme related to a modulation order of the FSK scheme, information related to a number of resource blocks (RBs) related to each band for the FQAM scheme, information related to a bit-map indicating a location of the band for the FQAM scheme, or information indicating a start point and an end point of the band for the FQAM scheme.

16. The method of claim 15, wherein the information related to the allocation type of the band for the FQAM scheme comprises information related to one of a time division multiplexing (TDM) type in which the band for the FQAM scheme is allocated to a time axis, a frequency division multiplexing (FDM) type in which the band for the FQAM scheme is allocated to a frequency axis, and a mixed type in which the TDM type and the FDM type is mixed.

17. The method of claim 13, further comprising transmitting an $\alpha$ value indicating a level of a non-Gaussian characteristic of inter-cell interference (ICI) to the BS.

18. The method of claim 13, wherein the information related to the band for the FQAM scheme is transmitted based on a system information block (SIB) or a physical downlink control channel (PDCCH).

19. A base station (BS) of operating a plurality of modulation schemes in a wireless communication system, the BS comprising:
a transceiver; and
a controller coupled with the transceiver and configured to:
identify a number of at least one mobile station (MS) having a channel state equal to or lower than a preset state from among a plurality of MSs within a cell managed by the BS; and
if it is determined that the number of the at least one MS is larger than or equal to a preset threshold, receive information related to a band for a hybrid frequency shift keying (FSK) and a quadrature amplitude modulation (QAM) Modulation (FQAM) scheme based on a QAM scheme and a FSK scheme from a network entity and transmit the information related to the band for the FQAM scheme to the at least one MS.

20. A network entity for operating a plurality of modulation schemes in a wireless communication system, the network entity comprising:
a transceiver; and
a controller coupled with the transceiver and configured to:
receive information related to a number of at least one mobile station (MS) having a channel state equal to or lower than a preset state from among a plurality of MSs within a cell managed by a base station (BS) from the BS; and
if it is determined that the number of the at least one MS is larger than or equal to a preset threshold, transmit information related to a band for a hybrid frequency shift keying (FSK) and a quadrature amplitude modulation (QAM) Modulation (FQAM) scheme based on a QAM scheme and a FSK scheme to the BS.

* * * * *